United States Patent [19]
Auberger et al.

[11] Patent Number: 5,069,429
[45] Date of Patent: Dec. 3, 1991

[54] PLANT FOR TREATING AND MELTING METALS, METAL COMPOUNDS AND/OR METAL ALLOYS OR FOR PRODUCING CALCIUM CARBIDE

[75] Inventors: Heinrich Auberger, Leonding; Heinz Müller, Neuhofen, both of Austria

[73] Assignee: Voest-Alpine Industrieanlagenbau G.m.b.H., Linz, Austria

[21] Appl. No.: 648,830

[22] Filed: Jan. 31, 1991

[30] Foreign Application Priority Data

Feb. 9, 1990 [AT] Austria .................................. 287/90

[51] Int. Cl.$^5$ ............................................. C21B 7/00
[52] U.S. Cl. ..................................... 266/143; 266/183
[58] Field of Search .................. 75/502, 707; 266/142, 266/143, 183

[56] References Cited

U.S. PATENT DOCUMENTS

| | | | |
|---|---|---|---|
| 3,939,297 | 2/1976 | Aylard et al. | 266/183 |
| 4,380,469 | 4/1983 | Sulzbacher | 75/502 |
| 4,448,402 | 5/1984 | Weber et al. | 266/183 |

Primary Examiner—S. Kastler
Attorney, Agent, or Firm—Hopgood, Calimafde, Kalil, Blaustein & Judlowe

[57] ABSTRACT

There is disclosed a plant for treating and melting metals, metal compounds and/or metal alloys or for producing calcium carbide. It includes a burden-receiving shaft and a melting furnace arranged below the shaft and including a heating means. A passage opening is provided between the shaft and the melting furnace, which passage opening serves to introduce the burden present within the shaft into the melting furnace.

In order to be able to introduce the hot burden into the melting furnace without difficulties and without operational failures due to charging means, a gas-permeable supporting plate rigidly arranged on the melting furnace is provided at the passage opening, corresponding to at least the shaft cross section by its cross section. A clearance is provided beside the supporting plate. The shaft is designed as a structural unit separate from the melting furnace. The shaft and the melting furnace are relatively movable with respect to each other in the direction of the clearance and back.

16 Claims, 2 Drawing Sheets

PLANT FOR TREATING AND MELTING METALS, METAL COMPOUNDS AND/OR METAL ALLOYS OR FOR PRODUCING CALCIUM CARBIDE

The invention relates to a plant for treating and melting metals, metal compounds and/or metal alloys or for producing calcium carbide, comprising a burden-receiving shaft and a melting furnace arranged below the shaft and including a heating means, a passage opening being provided between the shaft and the melting furnace, which passage opening serves to introduce the burden present within the shaft into the melting furnace.

A plant of this type is known from U.S. Pat. No. 4,380,469. This known plant serves to continuously melt largely pre-reduced metallurgical materials, in particular sponge iron. With the known plant, burden is supplied from a shaft to a melt-receiving melting furnace via a horizontal supply space, the burden impinging on the bath surface in the free fall. Closely above the bath surface, a burner is arranged, which is charged with brown coal dust and oxygen and whose flame sweeps the bath surface and is directed towards the falling burden. The fallen burden forms a conical pile departing from the melt.

With a plant of this type, the burden prevailing within the shaft and within the horizontal supply space over an extended period of time is exposed to a treatment (heating and gas passage) by means of the offgases withdrawn through the shaft. The supply of the burden into the melting furnace is effected by means of a mechanical arrangement provided below the shaft in the horizontal supply space. It consists of piston slides cyclically moving the burden in the direction towards the melting furnace.

It has proved that conveying means comprising movable parts and arranged within a furnace are susceptible to failures, an operational breakdown may occur, in particular, with elevated temperatures and intensive dust formation. The same applies to other conveying means, such as chain conveyors or cellular wheels, which additionally are very complex in terms of structure and get worn relatively quickly.

From U.S. Pat. No. 4,448,402 a worm-conveyor is known, which is arranged in a reduction shaft furnace and serves as a conveying means for bulk material to be conveyed from the reduction shaft furnace into a consecutively arranged meltdown gasifier. This known conveying means also is structurally very complex and prone to operational failures due to wear and caking. Moreover, the driving motor can easily be overstressed. The cantilevered mounting of the worm conveyor constitutes an additional disturbance-creating factor.

In a plant of the initially described kind, the operational failures and breakdowns occurring in the known conveying means may lead to an interruption of the entire process cycle, which is to be prevented at any rate.

The invention aims at avoiding these disadvantages and difficulties and has as its object to provide a plant of the initially defined kind with which a two-stage process is feasible, i.e., treating of the burden within the shaft and melting of the same in the melting furnace, melting also including melt reducing. The treatment of the burden within the shaft by heating and passing a gas therethrough is to take place until the necessary reactions have been completed and the burden has reacted completely. It is of a particular relevance that the reacted and, thus, hot burden be introducible into the melting furnace without any difficulties, operational failures caused by a charging means having to be reliably prevented.

In accordance with the invention this object is achieved in that a gas-permeable supporting plate rigidly arranged on the melting furnace is provided at the passage opening, corresponding to at least the shaft cross section by its cross section, a clearance is provided beside the supporting plate, the shaft is designed as a structural unit separate from the melting furnace, and the shaft and the melting furnace are relatively movable with respect to each other in the direction of the clearance and back, the shaft thus getting from an operational position above the supporting plate into a charging position beside the supporting plate and above the free clearance, and back again into the operational position above the supporting plate.

In order to facilitate movement in the direction of the plane of the supporting plate, the shaft and the melting furnace suitably are relatively movable in the vertical direction.

Advantageously a sealing is provided between the shaft and the melting furnace, surrounding the clearance and the supporting plate.

The relative movement in the vertical direction suitably may be utilized to ensure the tightness by providing the sealing with a peripherally extending groove filled with a sealant, such as sand or mineral wool, and a peripherally extending sealing ledge to be inserted into the groove.

To avoid thermal losses during charging, the melting furnace advantageously comprises a platform peripherally surrounding the clearance and the supporting plate and extending the same in the moving direction, the shaft, on its lower side facing the melting furnace, suitably having a flange extending in the moving direction and extending above the clearance in the operational position and above the supporting plate in the charging position.

In order to allow for the easy exchange of the supporting plate, the supporting plate advantageously is exchangeably fastened to the melting furnace.

The gas permeability of the supporting plate may readily be achieved by designing the supporting plate as a perforated plate. Advantageously, the supporting plate is made of graphite, of silicon carbide or of any other high-temperature resistant material, such as, e.g., ceramic material.

According to a preferred embodiment, the melting furnace is liftable and lowerable relative to the base, the melting furnace suitably being horizontally displaceable in the lowered position and the shaft stationarily being detachably mounted to a supporting structure.

Preferably, the shaft is provided with a lid in which at least one offgas opening and at least one charging opening are provided.

The interior of the shaft may readily be cleaned if the lid is detachably fastened to the supporting structure by attachment means that are independent of the shaft.

A preferred embodiment is characterized in that the shaft and the melting furnace are relatively movable towards each other in the direction of the plane of the supporting plate.

BRIEF DESCRIPTION OF THE DRAWINGS

The invention will now be explained in more detail by way of one embodiment illustrated in the drawing, wherein.

DETAILED DESCRIPTION OF THE INVENTION

Figure 1:
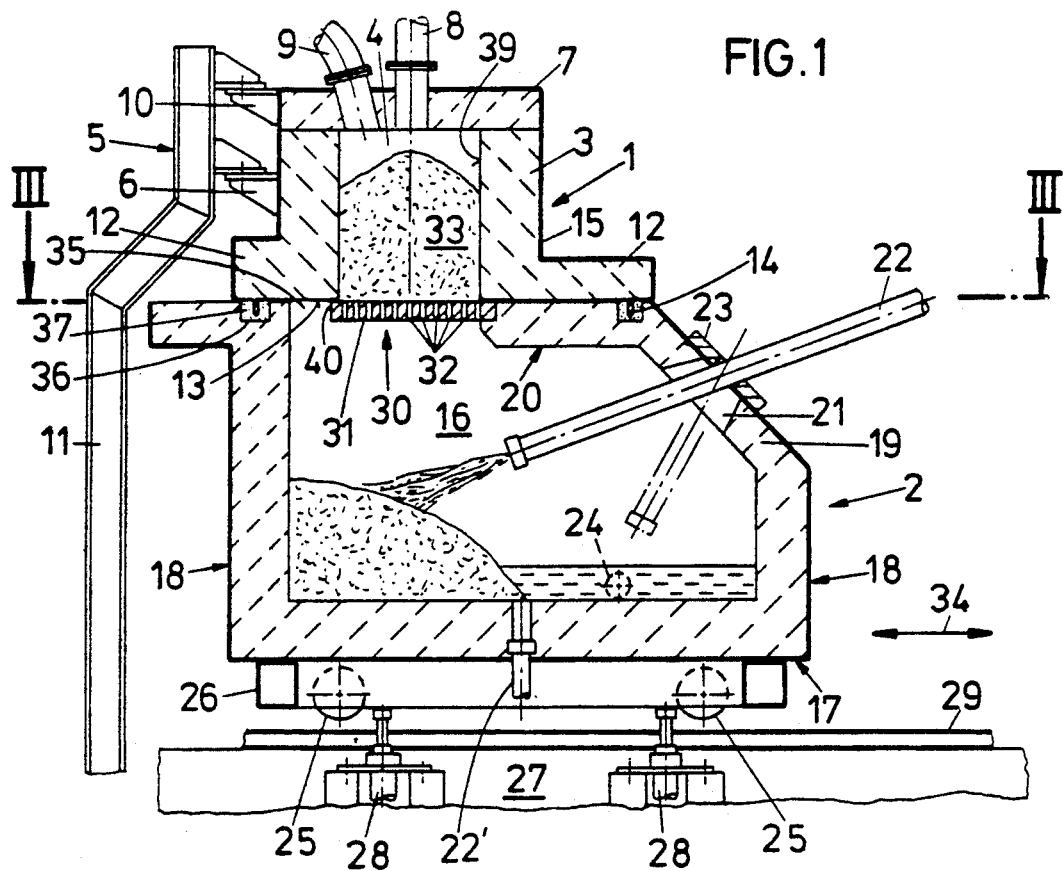
FIG. 1 is a vertical section of a plant according to the invention in the operational position, i.e. during melt-reducing within the melting furnace and treating the burden in the shaft.

The plant comprises a shaft 1 and a melting furnace 2 arranged below the shaft 1, both the shaft 1 and the melting furnace 2 being designed as separate structural units. The shaft 1 extends approximately in the vertical direction upwardly from the melting furnace 2 and has a refractory internal lining 3 delimiting a shaft internal space 4 that is straight over its height and has an approximately square cross section.

The shaft 1 is rigidly, yet detachably fastened by means of consoles 6 to the stationary supporting structure 5 in a suspended manner, preferably by means of a wedge connection. On the upper end of the shaft 1 there rests a lid 7 into which a burden supply duct 8 for charging burden and an offgas duct 9 run. The lid 7 is rigidly and also detachably fastened to the supporting structure 5 in a suspended manner by separate consoles 10.

The supporting structure 5 is formed by preferably three approximately vertically extending supports 11, which are arranged laterally beside the shaft 1 and peripherally surround the same.

A horizontal flange 12 is arranged on the lower end of the shaft 1; it will be discussed in further detail later on as in cooperation with the melting furnace 2. A peripherally extending sealing ledge 14 is arranged on the lower side 13 of the flange 12. The refractory internal lining 3 of the shaft 1 is surrounded by a plate shell 15. On its lower end, the shaft internal space 4 of the plant being in the operational position runs into the furnace interior 16 of the melting furnace 2 located therebelow.

The melting furnace 2 has an approximately horizontally arranged bottom 17 and vertically extending walls 18. One of the walls 18 verges into the furnace ceiling 20 via a slope 19. The bottom 17, the walls 18 and the ceiling 20 are refractorily lined. An opening 21 is provided in the slant part 19, through which a heating means 22, preferably a plasma burner, projects into the furnace interior 16. The pertaining bottom electrode is denoted by 22'.

A graphite electrode or a burner for fossil energy carriers might also be provided as the heating means.

The plasma burner 22 is pivotable and displaceable in its longitudinal direction such that different regions of the furnace interior 16 can be heated. The opening 21 is gas-tightly closed by a movable plate 23. Near the bottom, a closeable tap opening 24 is provided, through which molten material can be tapped.

The melting furnace 2 rests on a frame 26 equipped with wheels 25 or rollers and liftable and lowerable by a lifting means, which is formed by hydraulic cylinders 28 stationarily arranged on the base 27 in the exemplary embodiment illustrated.

Figure 2:
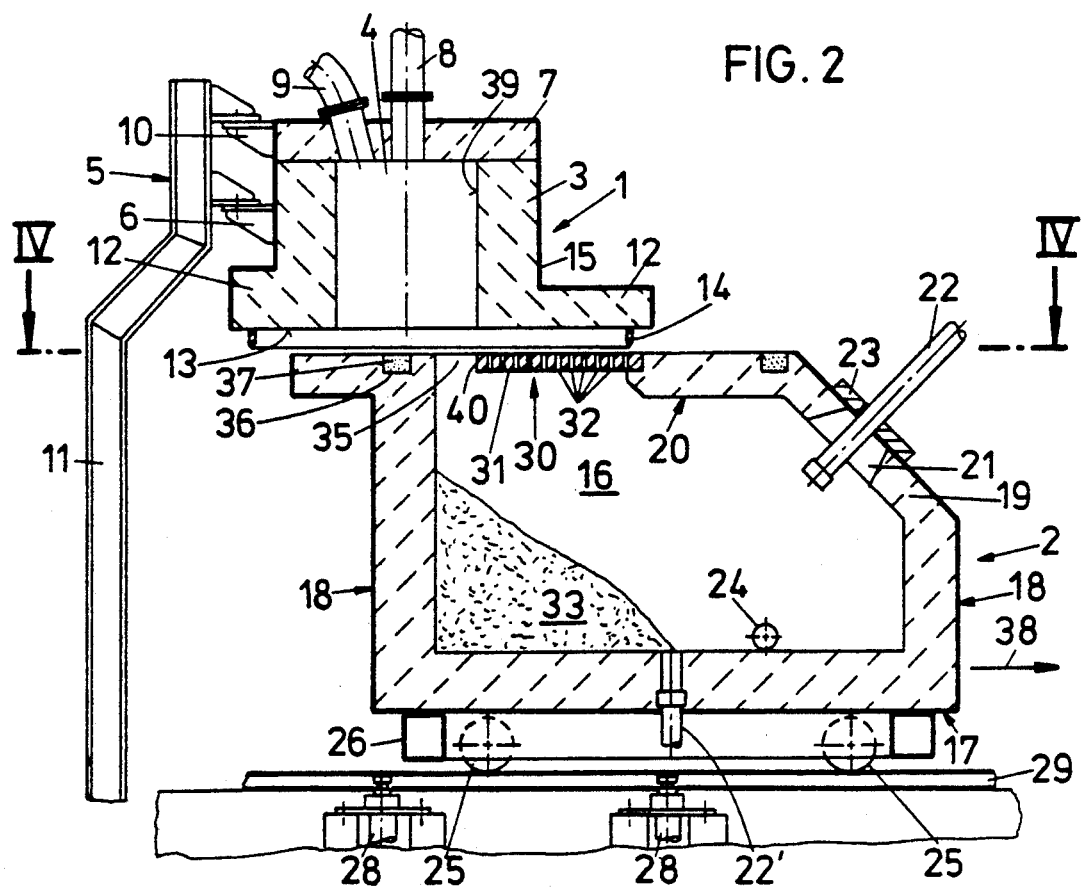
FIG. 2 is a vertical section of the plant in the charging position.
Figure 3:
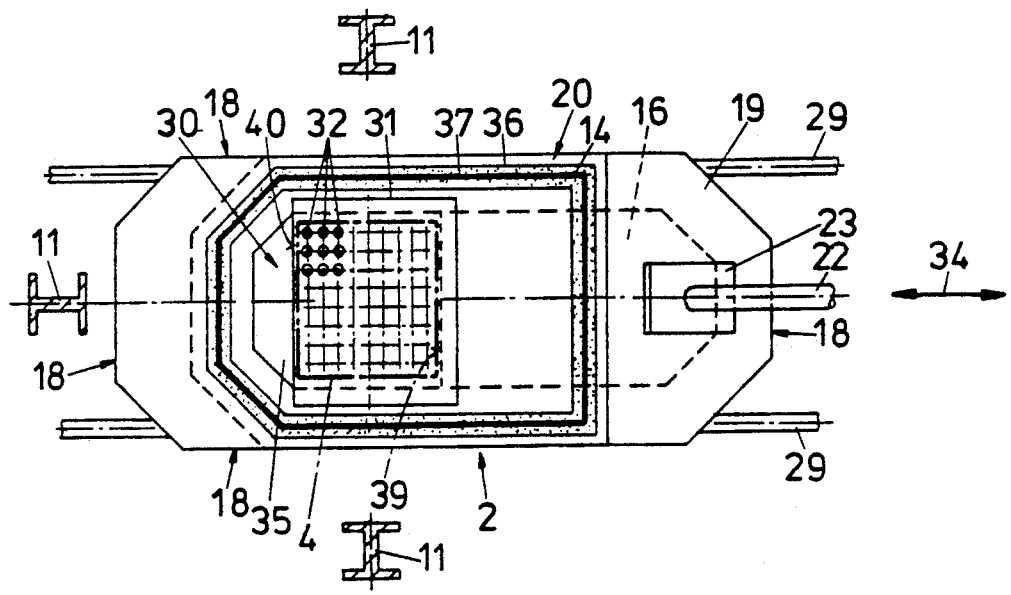
FIGS. 3 and 4 each are sectional views of the plant, the sections being led along lines III—III and IV—IV of FIGS. 1 and 2, respectively; the respective position of the shaft being indicated by dot-and-dash lines in FIGS. 3 and 4.
Figure 4:
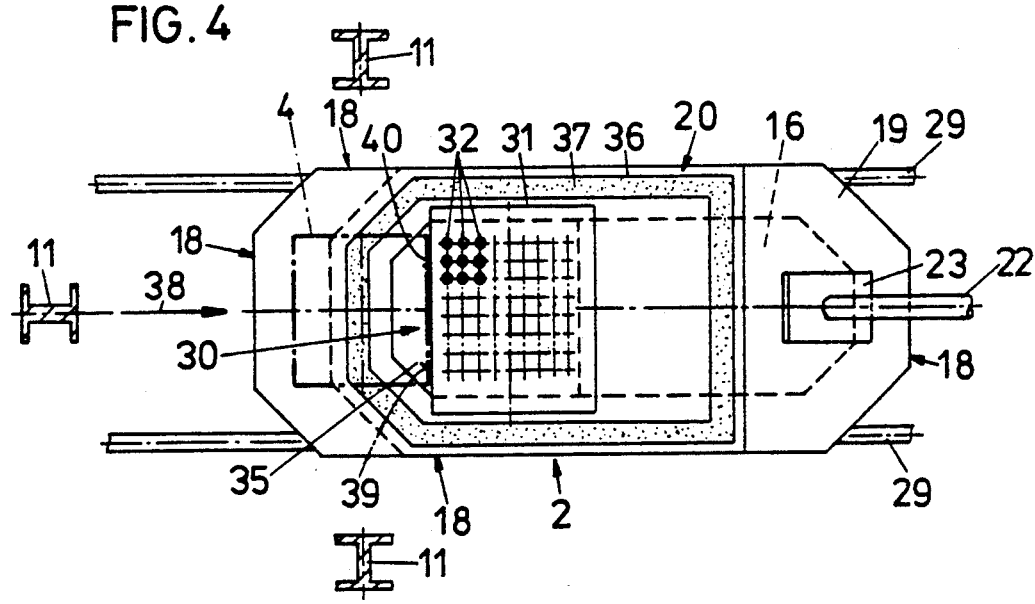

In the lowered position, which is illustrated in FIG. 2, the wheels 25 or rollers rest on rails 29 arranged in the horizontal direction on the base 27, the melting furnace 2 being displaceable along the rails 29 by means of a drive not illustrated (for instance, an electric gear motor driving the wheels 25). In the lifted position—the lifting stroke preferably amounts to two to ten centimeters—the ceiling 20 of the melting furnace 2 gets into contact with the flange 12 of the shaft 1.

In terms of area extension, the ceiling 20 of the melting furnace 2 corresponds to at least the surface of the flange 12 of the shaft 1. It has a passage opening 30 whose cross section is larger than the cross section of the shaft internal space 4 and which, for its major part, is covered by a supporting plate 31 made of graphite or silicon carbide and provided with vertical through holes 32. This supporting plate 31 has an area that is slightly larger than the cross section of the shaft inner space 4. It is arranged in a manner that the shaft inner space 4, in the operational position illustrated in FIG. 1, is directly above the supporting plate 31 and, thus, directly above the heating means 22 of the melting furnace 2, burden 33 present within the shaft 1 being supported by the supporting plate 31. Laterally beside the supporting plate—seen in the moving direction of the melting furnace 2 (which is indicated by the double arrow 34)—a clearance 35 is provided, which, however, is covered by the lower side 13 of the flange 12 of the shaft 1 in the operational position. The supporting plate 31 is located on a depression externally provided in the ceiling 20 and is readily exchangeable. It is displaceable together with the melting furnace 2.

The ceiling 20 of the melting furnace 2 externally comprises a peripherally extending groove 36 corresponding to the sealing ledge 14 and filled with a sealant 37, such as mineral wool or sand, into which groove the sealing ledge 14 sealingly projects with the melting furnace 2 lifted.

In the lowered position, the melting furnace 2 can be moved at least until the internal side 39 of the shaft 1, which is the front one in the moving direction (cf. arrow 38), has reached the end rim 40 of the supporting plate 31 located opposite this moving direction 38, upon which the clearance 35 follows, as is illustrated in FIG. 2. Due to this horizontal movement, the burden 33 present in the shaft 1, which has been passed and heated by the hot offgases of the melting furnace during operation of the melting furnace, falls into the furnace interior 16 through the clearance 35. As is apparent from FIG. 2, the flange 12 of the shaft 1 is extended in the moving direction 38 to such an extent that the supporting plate 31 is covered by the flange 12, thermal losses thus being largely avoided.

The invention is not limited to the exemplary embodiment illustrated in the drawing, but may be modified in various aspects. It is, for instance, possible to make the melting furnace 2 only displaceable, but not liftable and lowerable, and to mount the shaft 1 on the supporting structure 5 so as to be liftable and lowerable instead. As a further variant, it is feasible to move the shaft 1 horizontally and/or also to design it liftable and lowerable. In the latter case, the melting furnace may be immovably mounted on the base. Also may the shaft inner space 4 be designed conically over its height and have a cross section other than a square one.

What is essential for the plant to function is the relative movability of the shaft 1 in respect of the melting furnace 2, which is realized by means arranged externally on the plant, thus moving the shaft inner space 4 to above the clearance and allowing for charging of the melting furnace 2. The basic advantage thereby achieved is to be seen in that a high operational safety is safeguarded by avoiding movable parts in the shaft and in the furnace interior.

Preferably, the relative movement between the shaft 1 and the melting furnace 2 is oriented in the direction of the plane of the supporting plate 31, i.e., the supporting plate 31 extends parallel to the rails 29. However, this is not necessary in principal; the supporting plate 31 also could be arranged in an inclined manner. In such a case, the clearance 35 would have to follow upon the lower end or upon an inclined end of the supporting plate 31.

The lifting and lowering of one of the parts, either of the shaft 1 or of the melting furnace 2 (or even of both parts), which occurs in the vertical direction, enables the easy displacement or movement in the horizontal direction and, in addition, the attachment of an effective sealing 14, 36, 37, thus keeping heat and gas losses low.

If a supporting plate 31 were damaged, it could be substituted in a simple manner. It suffices to move the melting furnace 2 to below the shaft 1 laterally until the supporting plate 31 has been laid bare.

The independent attachment of the lid 7 of the shaft 1 renders the shaft inner space 4 readily accessible, for instance, in order to effect cleaning. For this purpose, the fastening of the shaft 1 to the supporting structure 5 is loosened in the operational position of the plant while the fastening of the lid 7 on the supporting structure 5 is maintained. After this, the melting furnace 2 is lowered, the shaft 1, which then rests on the furnace ceiling 20, being lowered together with the same. By moving the melting furnace in the direction 38, the shaft 1 moving commonly with the melting furnace 2 gets into a position lateral of the lid 7, thus being readily accessible. If also the attachment of the lid 7 is loosened, the entire plant below the burden supply duct 8 and the offgas tube 9 can be moved away.

In the following, the functioning of the plant is described in respect of the production of a silicon melt:

The plant is in the operational position according to FIG. 1. The shaft 1 is filled with a carbon carrier, e.g. with charcoal. Lumpy or sandy quartz ($SiO_2$) and the respective amount of silicon carbide (SiC) required for the chemical reaction have been charged into the melting furnace 2. By the introduction of energy via the heating means 22, silicon (Si), SiO and CO gases are formed from this mixture. The gases penetrate into the shaft 1 through the supporting plate 31 and $SiO_2$ reacts to SiC and CO with the coal.

After the coal has been converted to silicon carbide, the necessary amount of quartz is fed into the shaft 1. Subsequently, this mixture is charged into the furnace interior 16. For this purpose, the melting furnace 2 is lowered by retracting the hydraulic cylinders 28, until the wheels 25 rest on the rails 29 and the melting furnace 2 can be moved below the shaft 1 as far as to the end of the charging position. Thereby, the supporting plate 31 forming the bottom of the shaft inner space 4 in the operational position is moved away below the same, the charging stock present in the shaft inner space 4, thus falling into the reaction space of the melting furnace 2. Subsequently, the melting furnace 2 is moved back into the operational position and the shaft inner space 4 is filled with coal for a new process cycle after having lifted the melting furnace 2.

The functioning of the plant is the following in the production of a ferroalloy melt:

The plant is in the operational position according to FIG. 1. The shaft 1 is filled with burden 33 (ore, carbon carriers, slag formers). The ferroalloy (e.g., FeMn) is contained in the melting furnace 2. By the introduction of energy via the heating means 22 of the melting furnace 2, a ferroalloy as well as reducing $H_2$ and CO gases are formed from the burden 33. The gases penetrate into the shaft 1 through the supporting plate 31, heating the burden 33 in the shaft 1 and partially reducing the same. The dusts, intermediate products, sublimates and condensates contained in the gases are largely deposited on the burden or react with the same.

After having tapped the ferroalloy, the burden 33 is charged into the reaction space of the melting furnace 2. For this purpose, the melting furnace 2, as already described, is lowered by retracting the hydraulic cylinders 28, until the wheels 25 rest on the rails 29 and the melting furnace 2 can be moved below the shaft 1 as far as to the end of the charging position. After charging and restoring the operational position, the shaft inner space 4 is filled with burden 33 for a new process cycle.

The plant according to the invention is particularly suited to melt ferroalloys, such as Fe-Mn, Fe-Si, Fe-Cr, Fe-W, Fe-V, Fe-Mo, Fe-Ni, Fe-Co, Fe-Ti, Fe-Nb, Fe-Ta, Fe-P and Fe-Zr, to melt the metals Cu, Al, Ni, Co, Mg, Cr, W, Mo, Zr, Si, Hf, V and their alloys as well as to produce calcium carbide.

What we claim is:

1. In a plant for treating and melting a burden comprising one or more materials selected from the group consisting of metals, metal compounds, and alloys, including the production of calcium carbide, said plant comprising a burden-receiving shaft with an opening at its bottom through which burden is discharged, and a melting furnace having a bottom wall, side walls and a ceiling or top portion disposed below and in cooperative association with said shaft, said furnace being provided with a passage opening in said ceiling adapted to receiving burden present in said shaft through said shaft opening, the improvement which comprises:

a gas-permeable supporting plate disposed across said passage opening in said furnace ceiling and supported by said ceiling,
the size of said passage opening corresponding at least to that of said shaft opening and providing a clearance or opening adjacent the supporting plate when said plate is in place,
means separately supporting said shaft as a structural unit above and in cooperation with said melting furnace,
and means cooperatively associated with said melting furnace to effect displacement of said shaft relative to said furnace, including means to allow side-to-side movement of said melting furnace,
said shaft and said melting furnace being relatively movable one with respect to the other away from and to said clearance,
thereby enabling said shaft to be disposed in an operational position above said supporting plate and into a charging position adjacent said supporting plate and above said clearance and back again into said operational position above said supporting plate.

2. A plant as set forth in claim 1, wherein said shaft and said melting furnace are relatively movable in the vertical direction.

3. A plant as set forth in claim 2, further comprising sealing means disposed between said shaft and said melting furnace and surrounding said clearance and said supporting plate.

4. A plant as set forth in claim 3, wherein said sealing means is comprised of a peripherally extending groove about the top portion of said furnace filled with a sealant and a peripherally extending sealing ledge extending downwardly from said shaft adapted to be inserted into said groove, thereby sealing said shaft to the top of said furnace.

5. A plant as set forth in claim 4, wherein said sealant is selected from the group consisting of sand and mineral wool.

6. A plant as set forth in claim 1 further comprising a platform provided at the top of said melting furnace and peripherally surrounding said clearance and said supporting plate.

7. A plant as set forth in claim 6, wherein said shaft has a bottom side facing said melting furnace and further comprising a flange provided on said bottom side and extending in the lateral direction, said flange extending above said clearance in the operational position and above said supporting plate in the charging position.

8. A plant as set forth in claim 1, wherein said supporting plate is removably fastened to said melting furnace.

9. A plant as set forth in claim 1, wherein said supporting plate is structured as a perforated plate.

10. A plant as set forth in claim 1, wherein said supporting plate is made of graphite.

11. A plant as set forth in claim 1, wherein said supporting plate is made of silicon carbide.

12. A plant as set forth in claim 1, wherein said melting furnace is supported on a base and wherein said melting furnace is liftable and lowerable relative to said base.

13. A plant as set forth in claim 12, wherein said means for supporting said shaft is adapted to stationarily and detachably support said shaft, the melting furnace being horizontally displaceable in its lowered position.

14. A plant as set forth in claim 13, wherein said shaft has a lid which has at least one offgas opening and at least one charging opening therein.

15. A plant as set forth in claim 14, further including attachment means independent of said shaft for detachably fastening said lid to said supporting structure.

16. A plant as set forth in claim 1, wherein said shaft and said melting furnace are relatively movable towards each other in the plane of said supporting plate.

* * * * *